Dec. 3, 1935.  F. R. FORTIER  2,022,661
APPARATUS FOR EFFECTING CLARIFICATION OF LIQUIDS
Filed Jan. 24, 1934  2 Sheets-Sheet 1
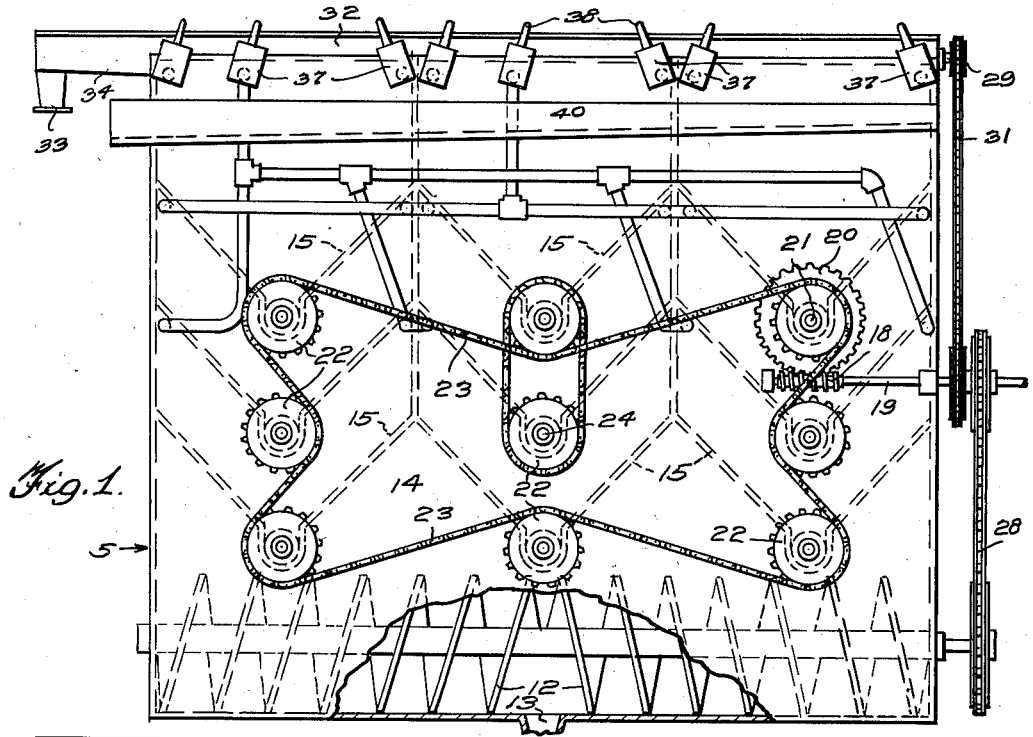
Fig. 1.
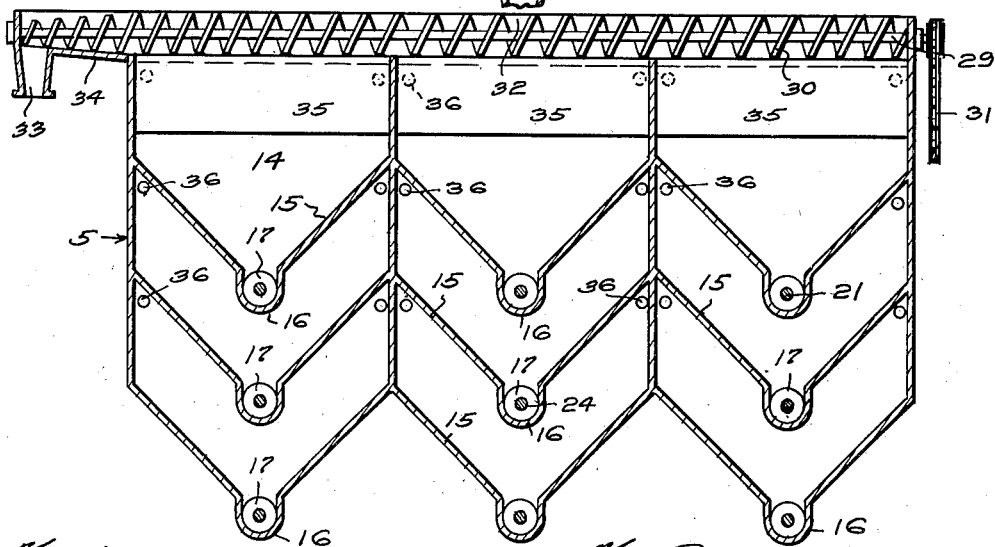
Fig. 2.
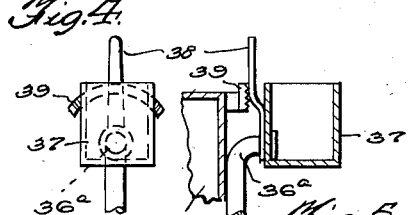
Fig. 4.
Fig. 5.
Inventor
F. R. FORTIER,
By Stephen Campbell
attorneys

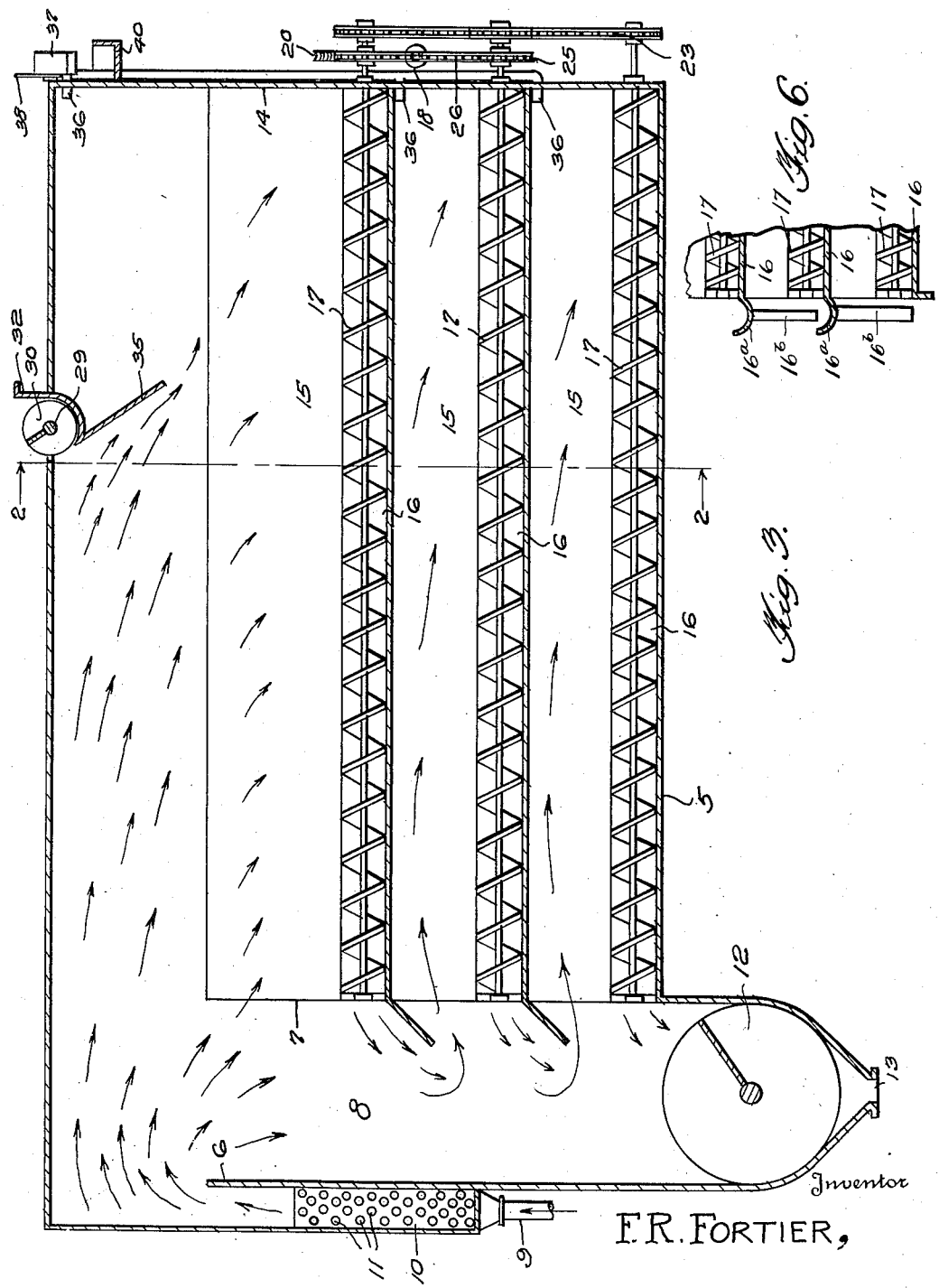

Patented Dec. 3, 1935

2,022,661

UNITED STATES PATENT OFFICE 2,022,661

APPARATUS FOR EFFECTING CLARIFICATION OF LIQUIDS

Francis Rivers Fortier, Jeanerette, La.

Application January 24, 1934, Serial No. 708,165

18 Claims. (Cl. 127—11)

This invention relates to an apparatus for effecting clarification of liquids.

This application is a continuation in part of the application Serial No. 687,859, filed by me on September 1, 1933.

In the application referred to the accumulated scum was removed by flotation. I find that I can effect a material saving of liquid by effecting removal of the scum by mechanical means and preferably at a point in advance of that at which the clear liquid is drawn off. While the apparatus of the present invention is particularly designed for the clarification of cane juices in sugar manufacture, I wish it to be understood that I contemplate its use in any relation where fine flocculate, granular, colloidal, or other material held in suspension in a liquid is to be separated from said liquid.

It is the primary purpose of the present invention to bring about maximum results of efficiency and economy in the provision of clarification apparatus of the character described.

The advantageous features of the invention will be best appreciated by referring to the accompanying drawings wherein:

Figure 1 is a rear elevation of apparatus constructed in accordance with the invention.

Figure 2 is a transverse vertical sectional view thereof on line 2—2 of Figure 3.

Figure 3 is a central longitudinal sectional view.

Figures 4 and 5 are, respectively, face and sectional views of pivoted overflow control boxes hereinafter described, and Figure 6 is a sectional view showing a modification hereinafter described.

Like numerals designate corresponding parts in all the figures of the drawings.

In the particular form of the invention which I have chosen for purpose of illustration but which is by no means the only form in which the invention may be embodied, 5 designates a tank. This tank is provided with the spaced walls 6 and 7 which constitute a well 8 between them. The incoming liquid to be clarified, cane juice, for example, enters through a pipe 9 and passes through a heating chamber 10 in which a series of steam pipes 11 may be used to heat the said juice. As the liquid passes over the upper edges of the wall, the heavier particles held in suspension descend into the well 8, at the bottom of which a combined stirrer and conveyor 12 is located. This member is in the form of a spiral or worm, pitched in such fashion as to move the accumulated mud from the opposite ends of the tank toward a central mud discharge pipe 13. The space between the walls 7 and the rear wall 14 of the tank is utilized for the reception of a plurality of rows of trays or pans 15. These pans have the inclined bottoms, as shown, so that the lighter impurities carried along the passages a, b and c above said pans, are guided by said inclined bottoms into the troughs 16 which form part of the bottoms of the respective pans.

Worm conveyors 17 disposed in these troughs 16 turn very slowly, and move the accumulated sediment toward the left in Fig. 3, and discharge them into the well 8, where they ultimately reach the conveyor and stirrer 12 and are added to and form part of the mud that is handled by said stirrer.

Any suitable means may be employed for driving the conveyors 17. As one conventional way of accomplishing this, I have illustrated a worm 18 upon a main drive shaft 19; said worm acting to turn a worm wheel 20 on shaft 21 of one of said conveyors.

The shafts of the several conveyors carry sprocket wheels 22 which are engaged by a common sprocket chain 23 that is driven from the sprocket wheel of shaft 21. The sprocket chain 23 serves to drive all of the conveyors except the central conveyor 24, and this conveyor is driven by a sprocket wheel 25 and sprocket chain 26. The stirrer and conveyor 12 may be driven from shaft 19 by suitable sprocket mechanism, indicated at 28. The shaft 19 may also be utilized to drive the shaft 29 of a transverse worm 30, through sprocket mechanism 31. The worm 30 extends transversely across the top of the tank 35 with most of its diameter above the liquid level but with its lower portion slightly below the liquid level, and this conveyor is disposed in a trough-like member 32, the forward side of which is cut away so that the scum which collects upon the liquid may flow directly against the rear wall of said trough and against the worm 30.

This worm turns in such direction as to tend to carry the scum down into the liquid, or in other words, in such direction as to prevent the scum from being carried over the top of the rear wall of the trough and over into the clear juice zone. This worm conveyor 30 acts to conduct the scum laterally past the side wall of the tank and to discharge it from a spout 33.

That portion of the trough 32 which lies outside of the tank is not cut away, but, upon the contrary, constitutes a complete trough, as indicated at 34, and this portion 34 is inclined slightly upward away from the tank so that the liquid will not flow out of the spout 33 but only the scum will be discharged therefrom. To that end, the conveyor or worm may be tapered slightly in that portion of its length which lies above the portion 34 of the trough. From the under side of the trough 32, a baffle plate 35 extends rearwardly and downwardly. This baffle plate not only prevents any of the scum from passing rearwardly into the clear juice zone but it tends to direct any disturbed or sinking particles down toward the bottom of the uppermost settling tray, from whence the same are removed as muds.

I obtain maximum economy in construction cost and in housing space for large capacity clarifiers by building them with a plurality of settling compartments or V-shaped trays, each with its own worm or scroll conveyor for the removal of settled impurities, to be discharged into a common thickener. I preferably bring the incoming liquid up to simmering temperature. I am aware of the fact that in practically all forms of commercial clarifiers or settlers in the cane sugar industry, heat is added by an external source or heater, to the juice, prior to its entry into the clarifier or settler, where separation of suspended impurities is performed by gravity settling. The action of the heat effects a chemical reaction upon the impurities by the lime or other chemical used and coagulates the albumenoids. However, the built-in heating element in my machine steps up the heating to simmering temperature just at the moment when the incoming juice is released into the main body of liquid in the tank. This stepping up of the heating to simmering temperature, i. e. 212 plus degrees F., results in the setting up of juice currents that are created by the vapor generated in the incoming juice and by the release of entrained bubbles and these buoyant currents perform the physical task of lifting and supporting on the surface as a scum the lighter impurities that tend to rise or settle imperfectly and some of which would not rise at all without the assistance given by these currents delivered at this particular point. It is, of course, common practice to heat cane juice to simmering temperature, 212 plus degrees F. prior to its entry into clarifiers and also to heat cane juice in open coil defecators. As far as I am aware, I am the first to so locate the heating means with respect to the point of entry of the liquids that continuous clarification, without shutting down the apparatus, is possible. This continuous clarification is further facilitated by the fact that I have built into the machine a mud thickener which has the specific purpose of slowly agitating the settled impurities to thereby concentrate the precipitate. When lime and heat precipitate impurities in cane juice, they are in the form of a floc. This floc forms throughout the heated mass and envelops and traps in its fluffy folds a certain amount of the mother liquor which is of a lighter density than the floc. If allowed to settle undisturbed this entrapped mother liquor tends to increase the volume of bottoms or mud and to dilute the concentration of the settled impurities. If these settled muds are very slowly agitated a large part of the trapped mother liquor works free of the precipitate allowing the precipitate to settle further and become more compact.

The construction shown and described gives the utmost settling area in proportion to the space occupied by the apparatus. Further, marked operating economies are possible through a saving of heat in the liquid through reduction of radiation losses and in the saving of power brought about by the necessity for fewer transmission elements. The clear liquid is taken off, not only from the uppermost clear liquid zone but from the uppermost portions of the chambers which lie between the several rows of trays; these clear juice outlet pipes being indicated at 36. These pipes are preferably brought to near a common level where they are provided with outturned ends 36a upon which boxes 37 are pivoted to rock. Operating handles 38, movable over arcuate rack bars 39 in the way so common in agricultural machinery, provide means for adjusting these boxes to permit the overflow of the liquid at the desired level.

A trough 40, common to all of these boxes, may be disposed in position to receive the liquid as it is discharged from the boxes and to conduct it to any desired position.

An important advantage flowing from the use of the mechanical scum removing means constituted by the worm 30 resides in the fact that where a positive means of this sort is provided, I can let a much thicker blanket of scum accumulate over the body of the liquid than would be the case if I had to depend wholly upon flotation for the removal of the scum. This heavy blanket of scum has a high economic value as a heat preserving means, conserving the heat of the liquid contents of the tank to a marked degree.

It is apparent that the tank may be of varying sizes and shapes and that what might constitute the side of a tank of one shape, as for example a square tank, might constitute the end of a tank of another shape, as for example an oblong tank. Therefore, it is to be understood that the terms side and end are to be broadly interpreted as being interchangeably used both in this specification and in the appended claims.

In the modification illustrated in Figure 6, transverse troughs 16a receive the muds from the two upper rows of trays and discharge the same through pipes 16b to a point at about the level of the discharge of the mud from the lowermost row of trays. This arrangement prevents the mud from the uppermost row of trays from being carried into the space between the uppermost and the intermediate rows of trays, and prevents the mud from the intermediate row of trays from being carried into the space between the intermediate and the lower row of trays. This arrangement of conducting pipes would be unnecessary in sugar clarification but may be desirable in other fields where the settled muds are comparatively light.

Having described my invention, what I claim is:

1. Apparatus of the character described comprising a tank, means for introducing unclarified liquid at the entrance end of the tank, means for conducting clarified liquid from a point adjacent the other end of the tank at about the liquid level, a barrier extending across the tank at above liquid level, said barrier comprising a downwardly and rearwardly extending baffle which projects downwardly materially below the surface of the liquid, and a conveyor operating in advance of said barrier for conducting scum transversely from the tank.

2. Apparatus of the character described comprising a tank, means for introducing all of the incoming unclarified liquid at a single point at the entrance end of the tank, a vertical well rearwardly of the point of the entry of the liquid into which the heavier suspended particles in the liquid descend, a thickener adjacent the bottom of said well, a tier of collecting trays in the tank and extending from said well toward the discharge end of the tank, the spaces between said trays being in communication with the said well, conveying means associated with the several trays and acting to move accumulated sediment toward said well, and means for drawing off clarified juices from the spaces between the several trays of the tier.

3. Apparatus of the character described comprising a tank, a plurality of rows of trays disposed in a tier, conveying means along the bottom of the several trays, a well into which all of said conveying means discharge, and an agitator in said well, below the level of the lowermost tray.

4. Apparatus of the character described comprising a tank, a plurality of rows of trays disposed in a tier, conveying means along the bottom of the several trays, a well into which all of said conveying means discharge, an agitator in said well, and a transversely acting conveyor above the uppermost of said trays, acting to discharge scum transversely across the apparatus and above the uppermost row of trays, means for introducing liquid to be clarified at a common point in advance of all of said trays and means disposed at point of entry of the liquid for heating the same to simmering temperature, whereby an initial upward flow is imparted to the same.

5. Apparatus of the character described comprising a tank, a plurality of rows of trays disposed in a tier in said tank, conveying means along the bottom of the several trays, a well into which all of said conveying means discharge, and baffles for directing muds discharged from the uppermost rows of trays to the lower portion of said well, a heating means disposed at that side of the well remote from the trays and means for introducing liquid to be clarified into the upper portion of said well and past said heating means, whereby the said liquid is heated and given an initial upward flow across the top of said well.

6. Apparatus of the character described comprising a settling tank, means for introducing unclarified liquid at one end of the tank, means for conducting clarified liquid from the tank at a point spaced materially from the point of entry of the liquid, means for heating the liquid to at least simmering temperature at or near its point of entry into the tank, and a scum collecting and removing means disposed across the surface of the liquid and across the path of travel of the scum from the entrance toward the discharge point of the tank, said means comprising a fixed barrier and a rotative spiral conveyor operating along the forward face of said barrier, the lower portion of said conveyor projecting through the scum and the said barrier projecting obliquely downwardly and rearwardly well below the level of the liquid in the tank.

7. Apparatus of the character described comprising a tank, means for introducing unclarified liquid at the entrance or front end of the tank, a vertical well rearwardly of the point of entry of the liquid into which the heavier suspended particles in the liquid descend, a thickener adjacent the bottom of said well, a tier of collecting trays in the tank and extending from said well toward the rear end of the tank, the spaces between said trays being in communication with the said well, conveying means associated with the several trays and acting to move accumulated sediment toward said well, heating means disposed at that side of the well remote from said trays and in the path of the entering liquid whereby said liquid is heated and given an initial upward flow at its point of entry and rearwardly across the upper portion of the well, and means for drawing off clarified juices from the spaces between the several trays of the tier.

8. Apparatus of the character described comprising a tank, a vertical well at the forward end of the tank, a tier of trays extending rearwardly in the tank from the rear side of the well, heating means disposed at the forward side of the well, means for introducing unclarified liquid past said heating means, and a downwardly and rearwardly directed baffle disposed across the tank at a point above the uppermost trays and extending materially below the surface of the liquid in the tank, the heating of the liquid imparting an initial upward flow to the same and said baffle imparting downward movement to sediment contained in said liquid, conveying means associated with the several trays acting to move accumulated sediment toward said well, and means for withdrawing the clarified liquid from the upper rear portion of the tank and rearwardly of said baffle.

9. A structure as recited in claim 8 in combination with a rotative spiral conveyor acting across the forward face of said barrier to discharge accumulated scum laterally from the tank.

10. Continuous clarification apparatus of the character described comprising a container, means for introducing unclarified liquid thereinto adjacent one end thereof, heating means of a capacity to heat the unclarified liquid to substantially simmering temperature, said heating means being located at or near the point of entry of the unclarified liquid into said container to thereby set up a circulation of the liquid upwardly and outwardly toward the rear end of the container, removal means for the scum toward the rear end of the container, means for drawing off the clarified liquid from a point beneath the surface of the liquid and rearwardly of the scum removal point, and a traveling conveyor conducting the precipitated muds from the rear toward the front end of the container and counter-current to the direction of travel of the scum from the entrance toward the discharge end of the container.

11. Apparatus of the character described comprising a receptacle, a heating means located therein adjacent the entrance end thereof, a conduit for discharging incoming unclarified cane juice into contact with said heating means, a baffle acting in conjunction with the heating means to direct the incoming heated juices upwardly and outwardly toward the rear end of the receptacle to thereby set up a circulation longitudinally in an arcuate path in said receptacle, conduits for withdrawing clarified liquids from the body of liquid within the receptacle at a point or points beneath the liquid level and at points toward the rear end of the receptacle and a conveyor for the precipitated muds, the whole constituting a substantially continuous clarification apparatus.

12. Continuous clarification apparatus of the character described comprising an elongated tank like receptacle, a heating means located therein adjacent the entrance end thereof, a conduit for discharging incoming unclarified cane juice into contact with said heating means, a baffle acting in conjunction with the heating means to direct the incoming heated juices upwardly and outwardly toward the rear end of the tank to thereby set up a circulation in said tank, a scum removing means acting laterally across the surface of the liquid to remove the floating scum, conduits for withdrawing clarified liquids from the body of liquid within the tank at a point or points beneath the liquid level and at points toward the rear end of the tank, a conveyor for the precipitated muds acting counter-current to the direction of movement of the scum prior to the removal thereof, and a thickener into which said conveyor discharges.

13. An apparatus of the character described comprising a tank, means for introducing unclarified cane juice thereinto, means located at the entrance end of the tank for heating the cane juice to substantially simmering temperature and materially above the temperature of the main body of liquid within the tank, means for conducting the mud along the bottom of the container, and a clear juice draw off conduit at the rear end of the tank and substantially at the level of the body of liquid in said tank at the point where a clear liquid zone has been created by the settling of the heavier impurities and the rise of the lighter impurities, said liquid having heat applied thereto within the tank only at the point stated, to thereby create convection currents in an upward and rearward path toward the rear of the tank, the whole constituting a means for the substantially continuous clarification of said juice.

14. A continuous clarification apparatus comprising in combination a receptacle, a plurality of superposed rows of trays within the receptacle, each row comprising a plurality of trays having laterally sloping bottoms by means of which precipitated sediment is directed to a constricted point in the width of each tray, said rows of trays terminating short of the front wall of the receptacle to leave a well common to all said trays, conveyors acting in the constricted portions of the tray bottoms to direct the accumulated sediment toward and into said well, and a laterally acting scum removing means extending across the top of the receptacle adjacent to the liquid level thereof and acting to discharge the scum of flotation from the surface of the liquid and means for drawing off clarified juices from the spaces between the trays of the several rows.

15. A continuous clarification apparatus comprising in combination a receptacle, a plurality of superposed rows of trays within the receptacle, each row comprising a plurality of trays having laterally sloping bottoms by means of which precipitated sediment is directed to a constricted point in the width of each tray, said rows of trays terminating short of the front wall of the receptacle to leave a well common to all said trays, conveyors acting in the constricted portions of the tray bottoms to direct the accumulated sediment toward and into said well, means for introducing a solution to be clarified at the front end of the tank, and heating means for keeping said liquid at simmering temperature at or near its point of entry, to thereby bring about an initial upward flow of the incoming liquid to aid in quickly separating floatable impurities from impurities which will ultimately precipitate, and directing the passage of the lighter particles upwardly and rearwardly across said well and means for drawing off clarified juices from the spaces between the trays of the several rows.

16. A continuous clarification apparatus comprising in combination a receptacle, a plurality of superposed rows of trays within the receptacle, each row comprising a plurality of trays having laterally sloping bottoms by means of which precipitated sediment is directed to a constricted point in the width of each tray, said rows of trays terminating short of the front wall of the receptacle to leave a well common to all said trays, conveyors acting in the constricted portions of the tray bottoms to direct the accumulated sediment toward and into said well, means for introducing a solution to be clarified at the front end of the tank, and means for keeping the liquid at simmering temperature at or near its point of entry, to thereby bring about an initial upward flow of the incoming liquid to aid in quickly separating floatable impurities from impurities which will ultimately precipitate, and to direct the passage of the liquid across said well, a laterally acting conveyor disposed across the receptacle toward the rear end thereof and at about the surface of the liquid and acting to remove scum of flotation from the surface of the liquid to a point outside of said receptacle and means for drawing off clarified juices from the spaces between the trays of the several rows.

17. Continuous clarification apparatus of the character described, comprising a tank, means for introducing clarified liquid into said tank adjacent the front end thereof, heating means of a capacity to heat the clarified liquid to substantially simmering temperature and located at or near the point of entry of said liquid into said tank to thereby heat said liquid to such point at its moment of entry into the body of liquid already in the tank as to set up a circulation of the liquid upwardly and outwardly toward the rear end of the tank, a scum removal means disposed toward the rear end of the container, and means for drawing off the clarified liquid from a point rearwardly of the scum removal point.

18. Continuous clarification apparatus of the character described, comprising a tank, means for conducting unclarified liquids into the tank at the forward or entrance end thereof, means for conducting the clarified liquids from the rear end of said tank, and a heating means located within the tank at the point of entry of the incoming juices to heat such juices at substantially the moment of their entry into the body of liquid within the tank, to thereby set up an upwardly and rearwardly directed current flow, from the entrance point to the discharge point of the liquid, throughout substantially the length of said tank, and to thereby bring about a quick separation between the impurities in the liquids which will ultimately float and those which will ultimately sink.

FRANCIS RIVERS FORTIER.